(12) United States Patent
Cain et al.

(10) Patent No.: US 10,852,836 B2
(45) Date of Patent: Dec. 1, 2020

(54) VISUAL TRANSFORMATION USING A MOTION PROFILE

(71) Applicant: Microsoft Technology Licensing, LLC, Redmond, WA (US)

(72) Inventors: Jonathan Marshall Cain, Seattle, WA (US); Devin Antonio Decaro-Brown, Seattle, WA (US); Alyssa Ann Dunn, Seattle, WA (US); Bryan Kim Mamaril, Seattle, WA (US); Kae-Ling Jacquline Gurr, Seattle, WA (US); Matthias Baer, Seattle, WA (US); Andrew Porter Hurley, Seattle, WA (US); Ryan Eugene Whitaker, Seattle, WA (US); Scott David Schenone, Seattle, WA (US); Tsitsi Isabel Kolawole, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/827,459

(22) Filed: Nov. 30, 2017

(65) Prior Publication Data

US 2019/0163281 A1 May 30, 2019

(51) Int. Cl.
*G06F 3/01* (2006.01)
*G06F 3/0487* (2013.01)
*G06F 1/16* (2006.01)

(52) U.S. Cl.
CPC ............ *G06F 3/017* (2013.01); *G06F 1/1641* (2013.01); *G06F 1/1694* (2013.01); *G06F 3/0487* (2013.01); *G06F 1/1616* (2013.01); *G06F 2203/04806* (2013.01)

(58) Field of Classification Search
CPC ...... G06F 3/017; G06F 3/0487; G06F 1/1694; G06F 1/1641; G06F 1/1616; G06F 2203/04806
See application file for complete search history.

(56) References Cited

U.S. PATENT DOCUMENTS

| | | | |
|---|---|---|---|
| 9,105,026 B1* | 8/2015 | Edwards | G06Q 20/40 |
| 2007/0281675 A1* | 12/2007 | Pletikosa | H04M 1/0233 |
| | | | 455/418 |
| 2009/0307634 A1 | 12/2009 | Strandell | |
| 2010/0079485 A1* | 4/2010 | Bentley | G06F 1/1626 |
| | | | 345/619 |
| 2010/0214216 A1* | 8/2010 | Nasiri | A63F 13/06 |
| | | | 345/158 |
| 2011/0248915 A1* | 10/2011 | Lu | G06F 3/017 |
| | | | 345/156 |
| 2014/0025750 A1 | 1/2014 | Dawar et al. | |

(Continued)

OTHER PUBLICATIONS

"International Search Report and Written Opinion Issued in PCT Application No. PCT/US2018/060216", dated Jan. 18, 2019, 12 Pages.

*Primary Examiner* — Arpan P. Savla
*Assistant Examiner* — Zelalem "Zee" Shalu

(57) ABSTRACT

Techniques for visual transformation using a motion profile are described. According to one or more implementations, motion profiles are utilized that describe known motion patterns for different display devices. A motion profile for a particular display device, for example, can be leveraged for visually transforming visual objects that are displayed on the display device.

20 Claims, 12 Drawing Sheets

(56) References Cited

U.S. PATENT DOCUMENTS

2015/0135108 A1* 5/2015 Pope .................. G06K 9/00006
715/767
2015/0206350 A1 7/2015 Gardes et al.

* cited by examiner

VISUAL TRANSFORMATION USING A MOTION PROFILE

BACKGROUND

Devices today support a variety of different usage scenarios and user experiences. Certain devices, for instance, can be physically oriented in different ways to enable diverse forms of user experience and user interaction. For example, many devices include a rectangular display that can be rotated to assume different orientations, such as a portrait orientation and a landscape orientation. Adapting device functionality such as system-level functionality and applications to changes in device orientation presents a number of implementation challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for visual transformation using a motion profile are described. According to one or more implementations, motion profiles are utilized that describe known motion patterns for different display devices. A motion profile for a particular display device, for example, can be leveraged for visually transforming visual objects that are displayed on the display device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for visual transformation using a motion profile are described. According to one or more implementations, motion profiles are utilized that describe known motion patterns for different display devices. A motion profile for a particular display device, for example, can be leveraged for visually transforming visual objects that are displayed on the display device.

Consider, for instance, an example display device is attached to a support structure such as a wall or a stand such that the display device can rotate relative to the support structure. A motion profile for the display device can indicate that the display device can engage in rotational movement. Thus, when movement of the display device is detected (e.g., via a sensor), the motion profile can be used to characterize a type and/or direction of the movement without having to rely solely on sensor data to identify the movement as rotation. The motion profile can be used to generate a change to a visual object displayed on the display device, such as by visually reconfiguring the visual object in accordance with the display device movement.

Generally, typical ways of manipulating visual objects based on device motion rely solely on sensor data to describe the device motion. By utilizing motion profiles preconfigured with descriptors of device motion patterns, reliance on real-time sensor data is reduced. This results in power and processing resource conservation, thus increasing battery life and freeing processor bandwidth for other tasks. Further, sensor data indicative of device motion can be refined to account for noise and/or imprecision in the data since a general pattern of device motion is already known via a motion profile.

In the following discussion, an example environment is first described that is operable to employ techniques described herein. Next, a section entitled "Example Implementation Scenarios" describes some example implementation scenarios in accordance with one or more implementations. Following this, a section entitled "Example Procedures" describes some example procedures in accordance with one or more implementations. Finally, a section entitled "Example System and Device" describes an example system and device that are operable to employ techniques discussed herein in accordance with one or more implementations.

Having presented an overview of example implementations in accordance with one or more implementations, consider now an example environment in which example implementations may by employed.

Example Environment

Figure 1:
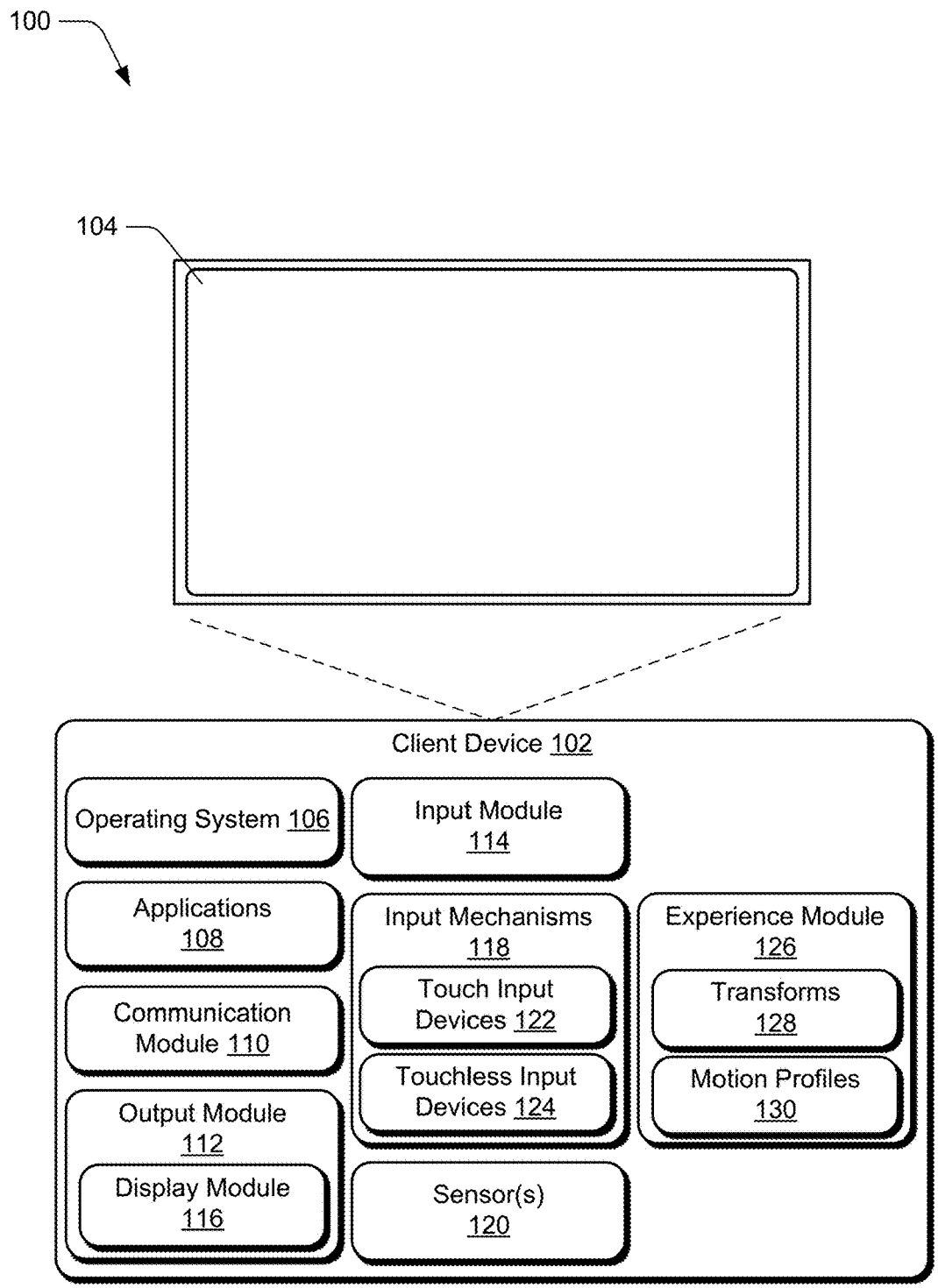
FIG. 1 is an illustration of an environment in an example implementation that is operable to employ the techniques described herein in accordance with one or more implementations.

FIG. 1 is an illustration of an environment 100 in an example implementation that is operable to employ techniques for visual transformation using a motion profile discussed herein. The environment 100 includes a client device 102 which can be configured in various ways. In at least one implementation, the client device 102 is configured for mobile use, such as a mobile phone, a tablet computer, a wearable device, a handheld gaming device, a media player, and so on. The client device 102, however, may be configured in other ways, such as a desktop computing device, a large screen meeting room device, a computing device with a tabletop form factor display, and so forth. Generally, the client device 102 may range from full resource devices with substantial memory and processor resources, to a low-resource device with limited memory and/or processing resources. An example implementation of the client device 102 is discussed below with reference to FIG. 12.

The client device 102 includes a display device 104 which is representative of functionality for visual output for the client device 102. In at least some implementations, the display device 104 represents functionality for receiving various types of input, such as touch input, stylus input, touchless proximity input, and so forth. The display device 104, for instance, includes a touch surface that is configured to receive touch input and generate touch input signals that can be utilized in various ways by the client device 102.

The client device 102 includes a variety of different functionalities that enable various activities and tasks to be performed. For instance, the client device 102 includes an operating system 106, applications 108, a communication module 110, an output module 112, and an input module 114. Generally, the operating system 106 is representative of functionality for abstracting various system components of the client device 102, such as hardware, kernel-level modules and services, and so forth. The operating system 106, for instance, can abstract various components (e.g., hardware, software, and firmware) of the client device 102 to enable interaction between the components and applications running on the client device 102.

The applications 108 are representative of functionality for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication module 110 is representative of functionality for enabling the client device 102 to communicate over wired and/or wireless connections. For instance, the communication module 110 represents hardware and logic for communicating data via a variety of different wired and/or wireless technologies and protocols. The output module 112 is representative of functionality for enabling various types of output via the client device. Example types of output enabled by the output module 112 include visual output, audio output, haptic output, and so forth. The output module 112, for instance, includes a display module 116 that is representative of functionality for managing visual output by the display device 104. The display module 116 can be implemented in various ways, such as a display driver, a graphics engine, a rendering engine, and/or combinations thereof.

The input module 114 is representative of functionality for receiving and routing various types of input to the client device 102. The client device 102, for example, includes input mechanisms 118 and sensors 120 that can be used to generates various types of input signals that can be received and routed by the input module.

Generally, the input mechanisms 118 represent different functionalities for receiving input to the client device 102, and include touch input devices 122 and touchless input devices 124. Examples of the input mechanisms 118 include gesture-sensitive sensors and devices (e.g., such as touch-based sensors), a stylus, a touch pad, accelerometers, a microphone with accompanying voice recognition software, and so forth.

According to various implementations, the touch input devices 122 represent functionality for receiving touch input to the client device 102. Examples of the touch input devices include the display device 104, a touch pad, a touch sensitive bezel to the display device 104, and so forth. The touch input devices 122, for instance, may be separate or integral with the display device 104, with integral examples including gesture-sensitive displays with integrated touch-sensitive sensors. The touchless input devices 124 generally represent functionality for detecting input that does not involve physical contact with the client device 102, such as a camera for detecting touchless gestures, proximity detection via capacitance sensing, and so forth.

The sensors 120 generally represent functionality for detecting different physical phenomena relative to the client device 102. The sensors 120 may be implemented separately from the input mechanisms 118, and/or may represent instances of the input mechanisms 118. Example implementations of the sensors 120 include motion sensors and/or orientation sensors, such as accelerometers, potentiometers, and/or gyroscopes configured to detect physical movement, position, and/or orientation of the display device 104 in space or relative movement and orientation with respect to a reference position. Further, the sensors 120 can include proximity sensors to detect a proximity of the user to the display device 104. The sensors 120 may also include audio sensors (e.g., a microphone and/or microphone array) to detect audio associated with an audio source (e.g., the user), such as voice commands issued by the user, and the audio can be used to determine a relative direction of the user with respect to the display device 104. Additionally, the sensors 120 can include grip sensors, such as touch sensors, configured to detect how a user is holding the client device 102 and/or the display device 104. Accordingly, a variety of different sensors 120 can be disposed on the client device 102 (e.g., on the display device 104) and can be leveraged to detect various different types of phenomena.

Further to techniques for visual transformation using a motion profile described herein, the client device 102 includes and/or makes use of an experience module 126. Generally, the experience module 126 is representative of functionality to generate visual transformations that can be applied to visual objects displayed on the display device 104. In at least one implementation, the experience module 126 is implemented as system software, such as part of the operating system 106. Alternatively, the experience module 126 represents a different standalone application or functionality. To enable different visual transformations to be applied to visual objects, the experience module 126 includes transforms 128 and motion profiles 130.

The transforms 128 are representative of functionality for describing and/or scripting visual manipulations of visual objects. The transforms 128, for instance, include data structures and/or algorithms that can be applied to visually manipulate (e.g., "transform") a visual object displayed on the display device 104. Generally, different instances of the transforms 128 can be employed to enable different types of visual transformations to be applied to visual objects, such as rotation, translation, resizing, visual anchoring (e.g., position and/or perspective anchoring), perspective changes, changes in brightness, color, and/or contrast, and so forth. An instance of a transform 128 may represent a single type of visual transformation or may represent a combination of multiple visual transformations. Alternatively or additionally, multiple instances of the transforms 128 can be combined to provide different types of visual transformations.

The motion profiles 130 are representative of functionality for describing different movement patterns and/or constraints for different devices and device types. The experience module 126, for example, can utilize the motion profiles 130 to evaluate the transforms 128 and generate visual transformations to be applied to visual objects. For instance, a particular transform 128 can be applied in different ways for different motion profiles 130.

Generally, the motion profiles 130 can be generated in various ways, such as based on a known motion constraint of a device, a known motion pattern for a device, a known usage scenario for a device, and/or combinations thereof. In at least one implementation, a motion profile 130 for the client device 102 is configured based on a known motion constraint for the client device 102. Consider, for example, that the display device 104 is fastened to a structure such as a stand or a wall. Further, the way in which the display device 104 is fastened presents constraints on movement of the display device 104. For instance, the display device 104 is fastened to the structure via a fastening mechanism that allows a particular type of movement of the display device 104 but prevents a different type of movement of the display device 104. Thus, a motion profile 130 for the display device 104 can be configured based on this movement constraint. Further, when the display device 104 is moved between different positions, the motion profile 130 can be applied to different transforms 128 to enable visual transformation of visual objects displayed on the display device 104.

Alternatively or additionally, a motion profile 130 for the client device 102 can be generated based on a known motion pattern for the client device 102, such as known typical way in which a user physically manipulates the client device 102. For instance, a portable implementation of the client device 102 can have a motion profile 130 that describes ways in which a user typically holds the client device 102 and ways in which a user typically moves the client device 102 between different orientations. Thus, a motion profile 130 can be generated based on a known motion constraint, a known motion pattern, or a combination of both.

In at least one implementation, a motion profile 130 for the client device 102 can be preconfigured, such as part of a manufacturing, programming, and/or deployment process for the client device 102. Alternatively or additionally, the motion profile 130 can be generated via a learning process that captures device movement data (e.g., from the sensors 120) over time and identifies movement patterns from the movement data. An identified movement pattern and/or set of movement patterns can then be used to generate and/or refine the motion profile 130. For instance, movement data alone can be used to generate a motion profile 130, or can be used to adjust and/or refine a preconfigured motion profile 130. Further attributes and applications of the motion profiles 130 are described below.

Having described an example environment in which the techniques described herein may operate, consider now a discussion of some example implementation scenarios in accordance with one or more implementations.

Example Implementation Scenarios

This section describes some example implementation scenarios for visual transformation using a motion profile in accordance with one or more implementations. The implementation scenarios may be implemented in the environment 100 described above, the system 1200 of FIG. 12, and/or any other suitable environment. The implementation scenarios and procedures, for example, describe example operations of the client device 102.

Figure 2:
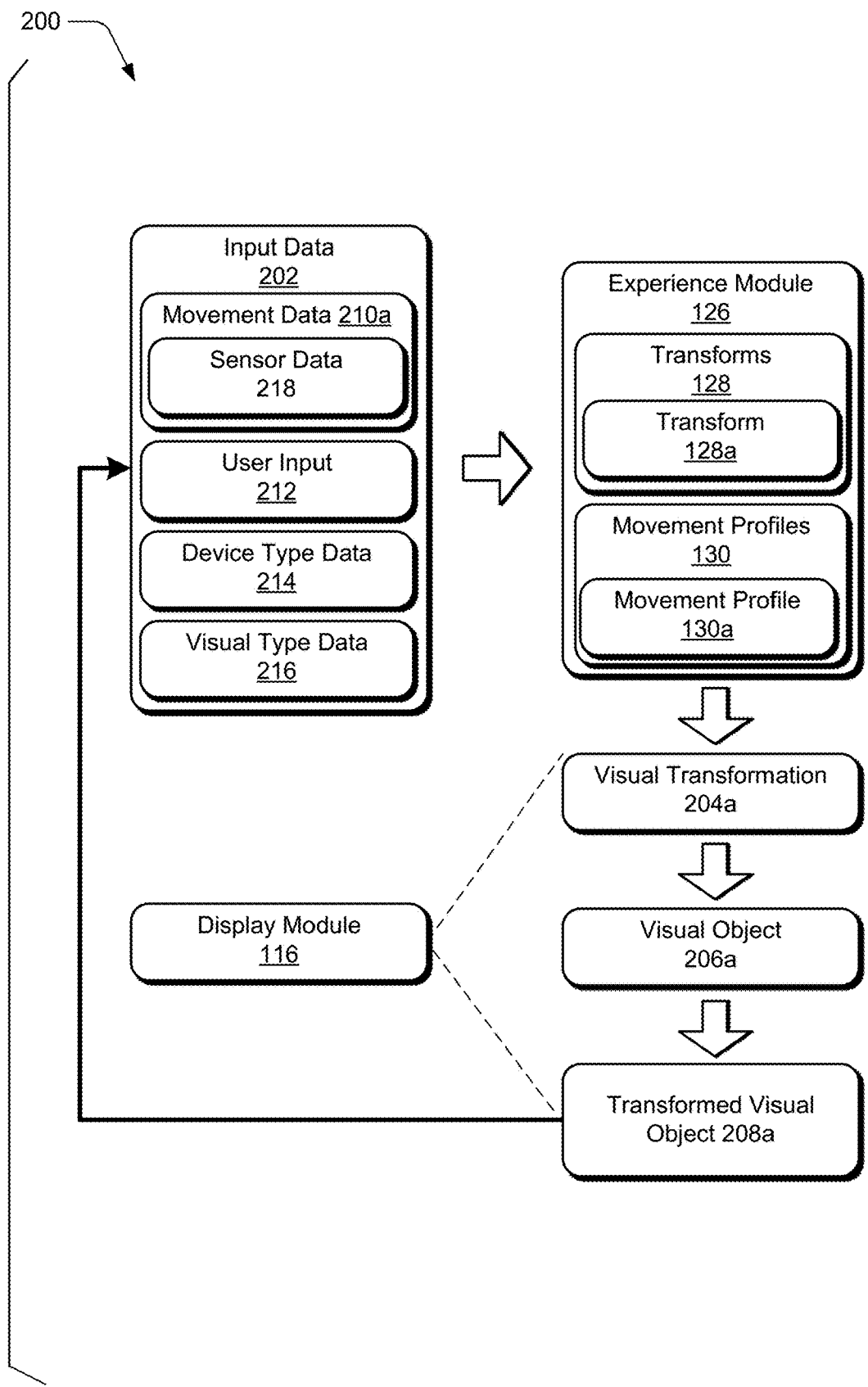
FIG. 2 depicts an example implementation scenario for transforming a visual object in accordance with one or more implementations.

FIG. 2 illustrates an example implementation scenario 200 for transforming a visual object. As an overview of the scenario 200, the experience module 126 utilizes input data 202a to generate a visual transformation 204a. The display module 116 applies the visual transformation 204a to a visual object 206a to generate a transformed visual object 208a.

The input data 202a generally represents different types of data that can be utilized by the experience module 126 to generate the visual transformation 204a. Examples of the input data 202a include movement data 210, user input 212, device type data 214, and visual type data 216. The movement data 210 describes aspects of detected movement of the display device 104. The movement data 210, for instance, includes sensor data 218 collected from one or more of the sensors 120. Example movements of the display device 104 that can be described by the movement data 210 include rotation, translation, tilting, panning, and so forth.

The user input 212 generally represents intentional and/or incidental input by a user to the client device 102. The user input 212, for instance, can be received via one or more of the input mechanisms 118. In at least one implementation, the user input 212 can indicate a user command to apply a particular type of transform 128 to the visual object 206a.

The device type data 214 represents information that describes various attributes of the display device 104, such as a make and/or model of the device, a size of the device (e.g., length and width), an aspect ratio of the device, a resolution of the device, an identifier for the display device 104 and/or the client device 102, and so forth.

The visual type data 216 includes information that describes the visual object 206a, such as an identifier for the visual object 206a that distinguishes the visual object 206a from other types and/or instances of visual objects. The visual type data 216, for instance, may identify the visual object 206a as a particular instance of a visual object, or as a particular type (e.g., category) of visual object. In at least one implementation, the visual type data 216 identifies a process that generates the visual object 206a, such as whether the visual object 206a represents a system-level visual (e.g., of the operating system 106), an application-level visual (e.g., for an application 108), or other process executing on the client device 102 that generates the visual object 206a. As further described below, different visual types can be associated with different transforms 128 to enable a variety of different user experiences.

Generally, the input data 202a may include various types of data that are usable to visually transform a visual object, including any one or combination of the examples presented above.

Continuing with the scenario 200, the experience module 126 receives the input data 202 and determines a transform 128*a* and a motion profile 130*a* to be applied for transforming the visual object 206*a*. In at least one implementation, the transform 128*a* is determined based on the visual type data 216. For instance, different types and/or instances of visual objects can be associated with different visual transformations provided by the transforms 128. In some examples, a visual transformation represents a change in orientation, position, and/or size of a visual object relative to a display surface on which the visual object is displayed, such as via rotation, resizing, perspective change, and so forth.

Further, the experience module 126 selects the motion profile 130*a* based on the device type data 214. The motion profile 130*a*, for example, describes a known movement pattern and/or patterns for the display device 104. The motion profile 130*a* can describe known movement patterns for the display device 104 in various ways, such as relative to a known point on the client device 102 (e.g., an instance of a sensor 120), relative to a known and/or fixed point that is external to the client device 102, and/or relative to a coordinate space, such as a 3-dimensional Cartesian coordinate space.

Accordingly, the experience module 126 evaluates the transform 128*a* using the movement data 210 and the motion profile 130*a* as inputs to the transform 128*a* to generate the visual transformation 204*a*. The visual transformation 204*a*, for instance, describes a visual transformation to be applied to the visual object 206*a*. In this particular example, the display module 116 applies the visual transformation 204*a* to the visual object 206*a* to generate the transformed visual object 208*a*. For example, the visual transformation 204*a* includes a visual rendering instruction that the display module 116 applies to the visual object 206*a* to generate the transformed visual object 208*a*.

According to one or more implementations, the scenario 200 is performed iteratively and/or recursively to generate multiple visual transformations that are applied to the visual object 206*a*. For instance, as the display device 104 moves between different orientations, the movement data 210 is updated to generate a series of visual transformations 204*a* that are applied to the visual object 206*a* to generate different transformed visual objects 208*a*. Thus, the visual object 206*a* can be transformed in response to movement of the display device 104.

Figure 3:
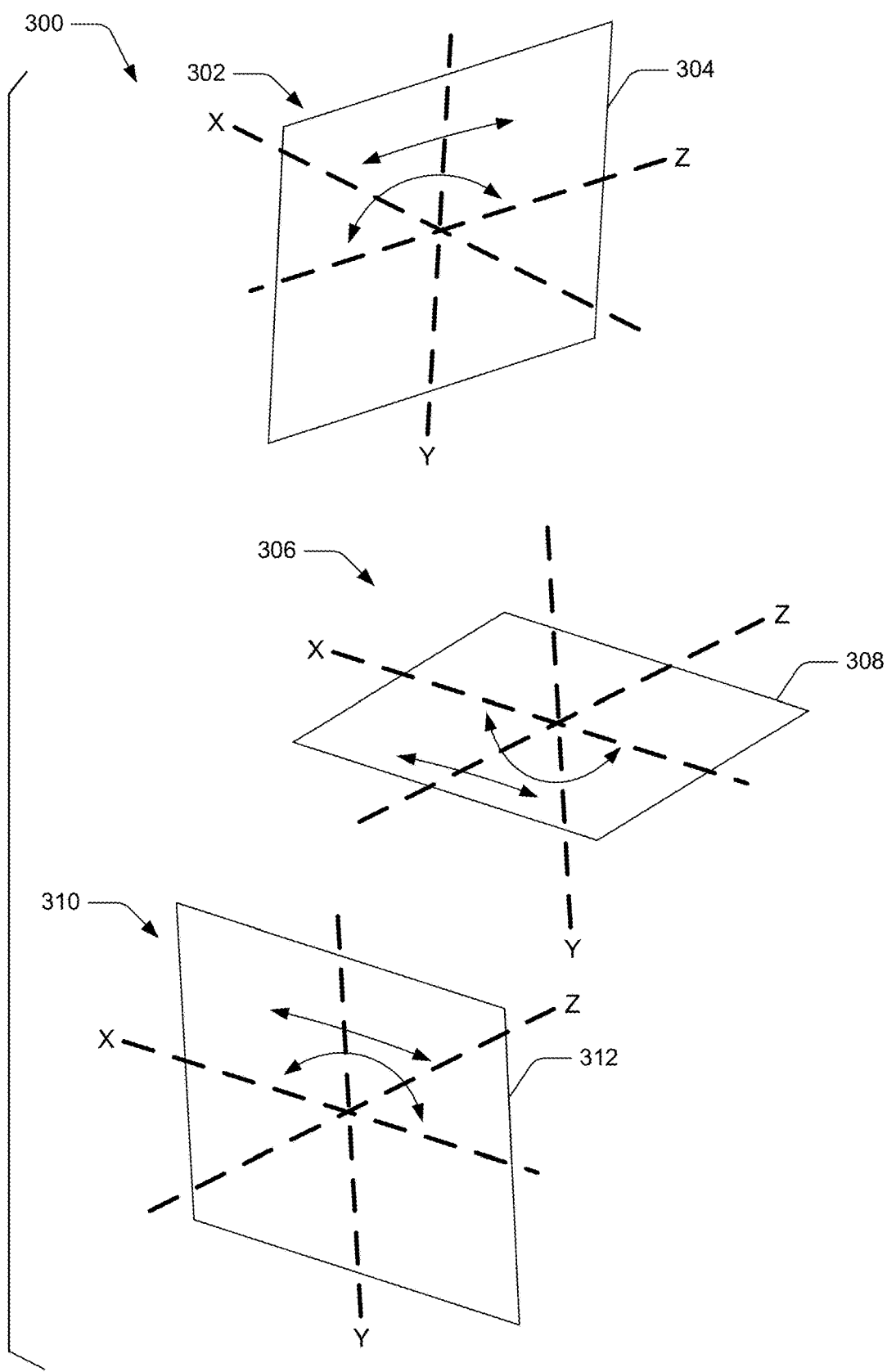
FIG. 3 depicts an example implementation scenario for showing different ways in which movement patterns can be characterized in accordance with one or more implementations.

FIG. 3 depicts an implementation scenario 300 showing different ways in which movement patterns can be characterized. The scenario 300 includes some example geometric planes in which device movement can be characterized. For purposes of this scenario, device movement is characterized using a 3-dimensional coordinate system. The upper portion of the scenario 300 includes a motion profile 302, which represents movement within a plane 304. The plane 304, for instance, represents a y, z plane in a 3-dimensional coordinate system. Examples of the motion profile 302 include rotation and/or translation within the plane 304.

The center portion of the scenario 300 includes a motion profile 306, which represents movement within a plane 308. The plane 308, for instance, represents an x, z plane in a 3-dimensional coordinate system. Examples of the motion profile 306 include rotation and/or translation within the plane 308.

The lower portion of the scenario 300 includes a motion profile 310, which represents movement within a plane 312. The plane 312, for instance, represents an x, y plane in a 3-dimensional coordinate system. Examples of the motion profile 310 include rotation and/or translation within the plane 312.

In one or more implementations, individual motion profiles 130 can be characterized as movement according to one of the motion profiles presented in the scenario 300, and/or a combination of the motion profiles. For instance, the display device 104 includes a motion profile 130 that indicates that the display device 104 is constrained to movement within a particular movement pattern, such as translation and/or rotation according a single instance of the motion profiles 302, 306, 310.

Figure 4:
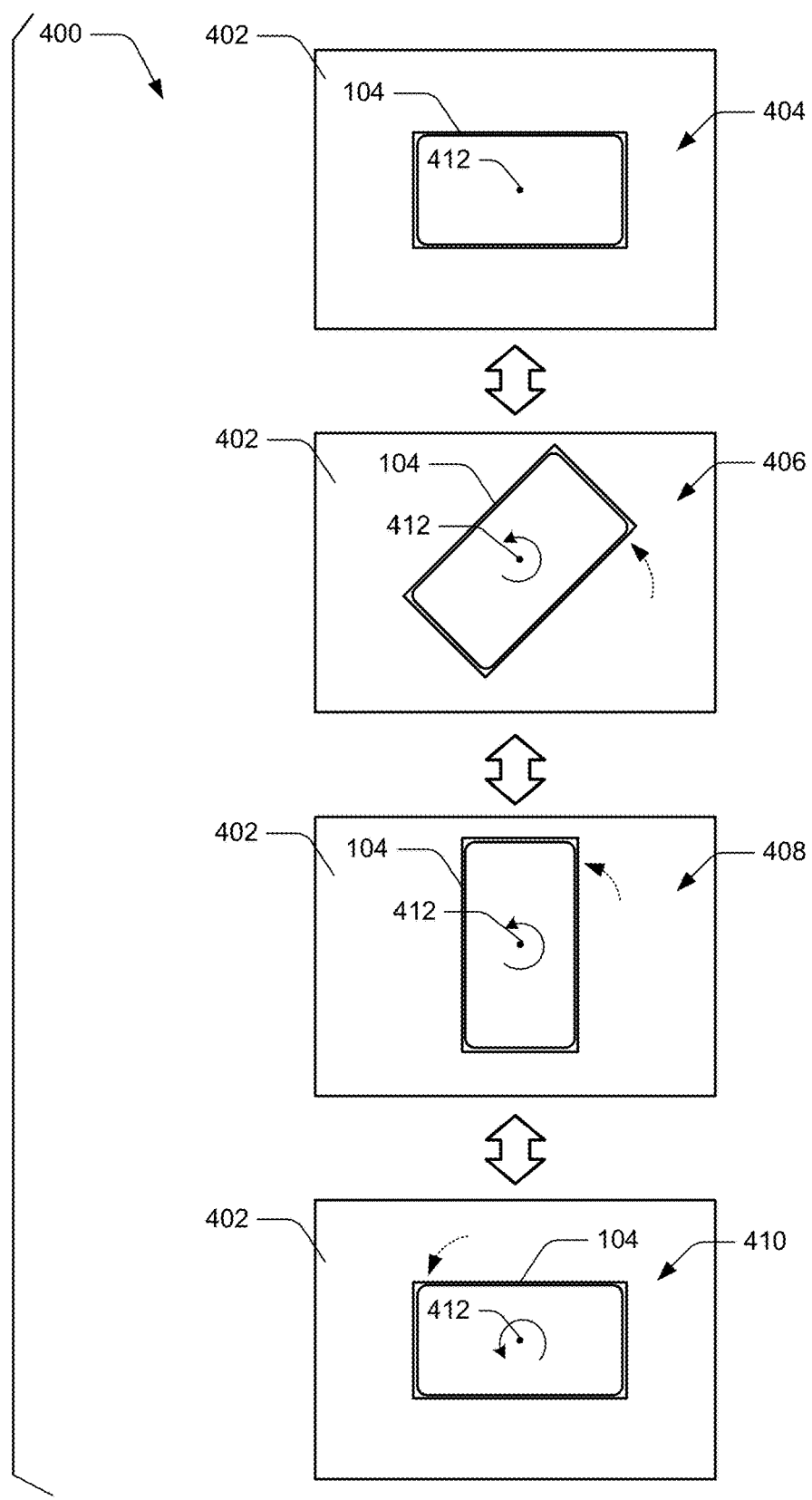
FIG. 4 depicts an example implementation scenario that describes an example motion profile for a device in accordance with one or more implementations.

FIG. 4 depicts an implementation scenario 400 that describes an example motion profile for a device. The scenario 400, for instance, depicts an example motion profile 130 for the display device 104.

The upper portion of the scenario 400 depicts the display device 104 fastened to a structure 402. The structure 402 can be implemented in various ways, such as a wall of a room (e.g., a conference room), a mounting stand, and so forth. The display device 104 is fastened to the structure 402 via a fastening mechanism that allows rotational movement of the display device 104 relative to the structure 402, such as a pivoting and/or rotating fastener. In the upper portion of the scenario 400, the display device 104 is oriented in a first orientation 404, which in this example is a landscape orientation.

Proceeding to the center and lower portions of the scenario 400, the display device 104 is rotated relative to the plane of the structure 402 to an orientation 406, to an orientation 408, and then to an orientation 410. For example, a user grasps the display device 104 and rotates the display device 104 from the orientation 404 to the orientations 406, 408, and 410. The orientation 408, for instance, represents a portrait orientation of the display device 104, and the orientation 406 represents a transitional orientation between the orientations 404, 408. In rotating between the different orientations, the display device 104 rotates about a center of rotation 412.

According to one or more implementations, a way in which the display device 104 is fastened to the structure 402 constrains movement of the display device 104 to rotation relative to the structure 402. Thus, a motion profile 130 for the display device 104 can be generated to reflect a rotation of the display device 104 about the center of rotation 412. In at least one implementation, rotation of the display device 104 can be detected in different ways, such as rotation relative to the center of rotation 412.

Figure 5:
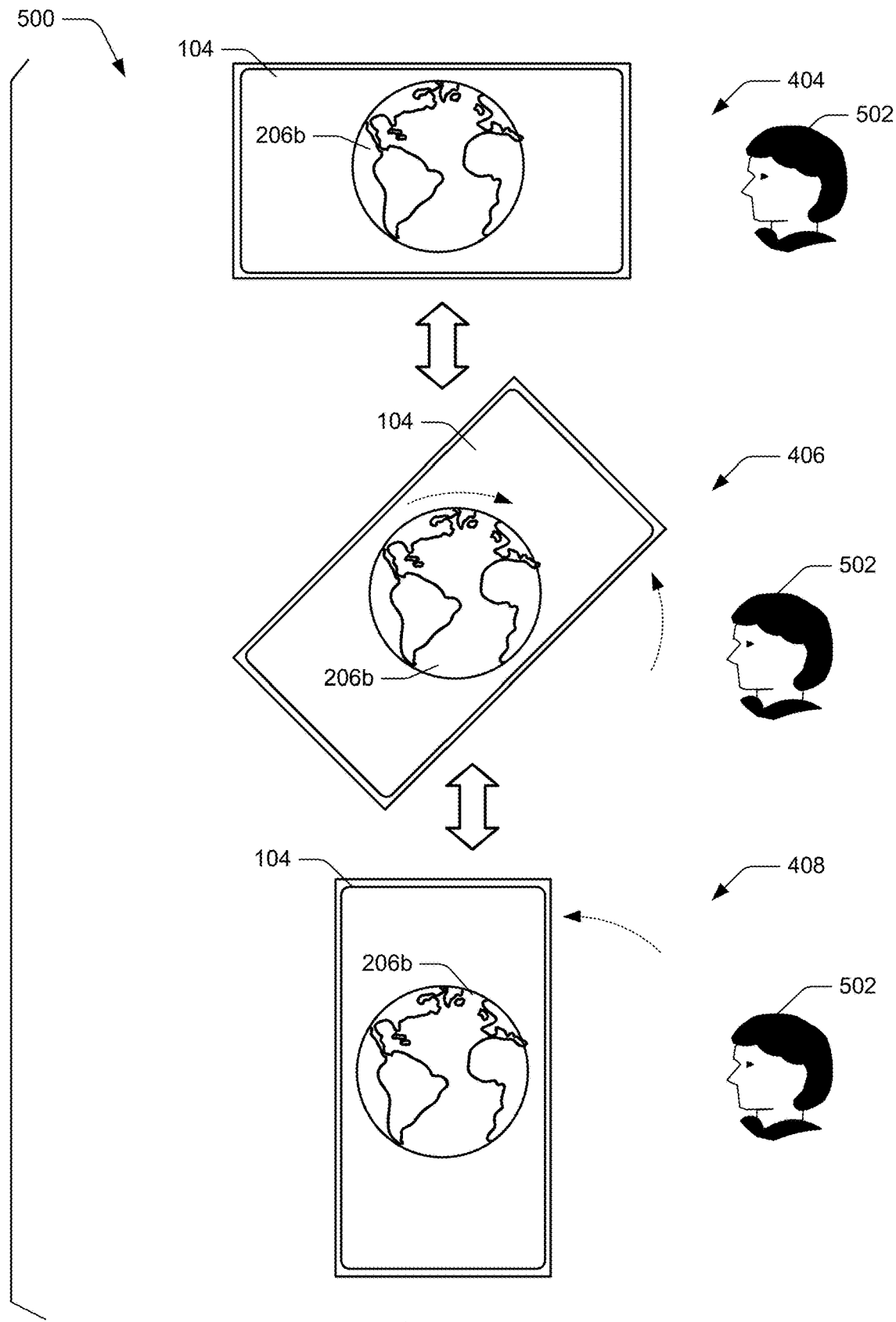
FIG. 5 depicts an example implementation scenario for visual transformation in accordance with one or more implementations.

FIG. 5 depicts an example implementation scenario 500 for visual object transformation. The scenario 500, for instance, represents an implementation of the scenarios 200, 400 described above. The upper portion of the scenario 500 includes a visual object 206*b* displayed on the display device 104, with the display device in the orientation 404.

Proceeding to the center and lower portions of the scenario 500, the display device 104 is rotated to the orientation 406 and then to the orientation 408. Notice that as the display device 104 is rotated to the orientations 406, 408, a visual orientation of the visual object 206*b* remains consistent from an observer's viewpoint. For instance, a user 502 that is observing the display device 104 observes that as the display device 104 rotates, an orientation of the visual object 206 does not change relative to the user's viewpoint, e.g., a surrounding environment that is external to the display device 104.

To enable the orientation of the visual object 206*b* to remain consistent through the rotation of the display device 104, the visual object 206*b* is rotated relative to the display device 104 as the display device 104 rotates. For instance, in the context of the scenario 200, consider that the visual object 206*b* represents an instance of the visual object 206*a*. The movement data 210*a* indicates the rotation of the display device 104 from the orientation 404 to the orientation 408. Further, the device type data 216 identifies the display device 104 and is thus used to select the motion profile 130*a* for the display device 104. The visual type data 216 corresponds to the visual object 206*b* and is used to select the transform 128*a* to be applied to the visual object 206*b*.

Accordingly, as the display device 104 is rotated, the movement data 210 indicates the rotation and the experience module 126 uses the movement data 210 to iteratively evaluate the transform 128*a* to generate the visual transformation 204*a*. In one variation, the movement data 210 can be used to initiate the transform 218*a*, and the experience module 126 can continue to apply the transform 128*a* to generate the visual transformation 204*a* independent of further motion data, or using periodic motion data. Alternatively the experience module 126 can apply the transform 128*a* without the movement data 210 to generate the visual transformation 204*a*. The visual transformation 204*a*, for instance, indicates that the visual object 206*b* is to be rotated relative to the display device 104. Thus, the display module 116 applies the visual transformation 204*a* to the visual object 206*b* to cause the transformed visual object 208*a* to be displayed, e.g., the rotated versions of the visual object 206*b* depicted in the center and lower portions of the scenario 500.

The scenario 500 also enables the visual object 206*b* to be transformed when the display device 104 is rotated from the orientation 408 back to the orientation 404. For instance, when the display device 104 is rotated from the orientation 408 to the orientation 404, the visual object 206*b* is transformed as described above to enable the visual orientation of the visual object 206*b* to remain consistent (e.g., static) as the display device 104 is rotated. While the scenario 500 is depicted with reference to movement of the display device 104 between the orientation 404 and the orientation 408, it is to be appreciated that the illustrated visual transformation may be applied to visually transform the visual object 206*b* when the display device 104 is moved to the orientation 410 discussed above with reference to the scenario 400. Thus, the scenario 500 depicts an implementation where a known motion pattern for a display device is utilized to enable visual transformation of a visual object.

Figure 6:
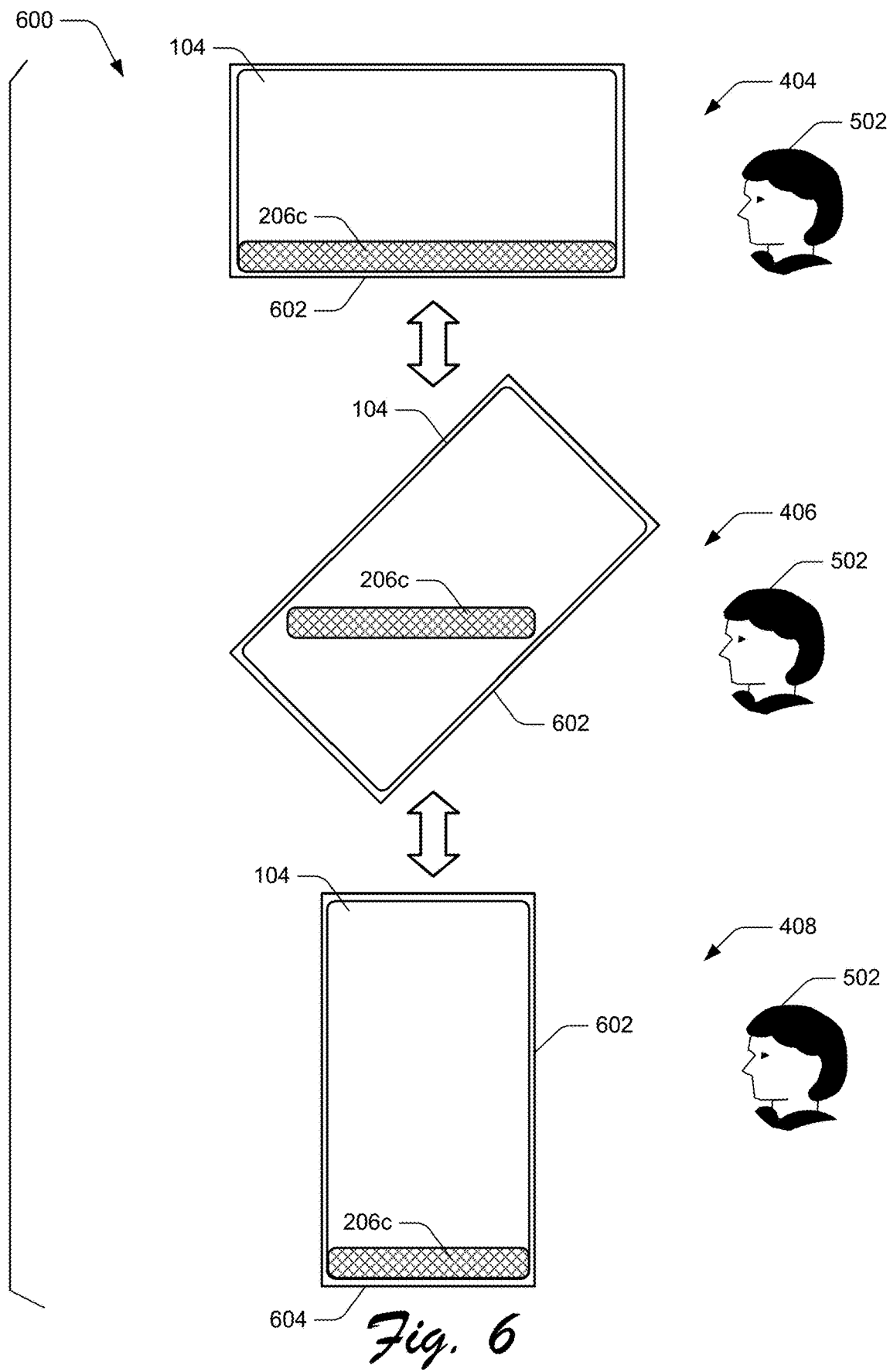
FIG. 6 depicts an example implementation scenario for visual transformation in accordance with one or more implementations.

FIG. 6 depicts an example implementation scenario 600 for visual object transformation. The scenario 600, for instance, represents an implementation of the scenarios 200, 400 described above. The upper portion of the scenario 600 includes a visual object 206*c* displayed on the display device 104, with the display device 104 in the orientation 404.

The scenario 600 illustrates that as the display device 104 is rotated from the orientation 404 to the orientation 406 and then to the orientation 408, a visual orientation of the visual object 206*c* remains consistent but the visual object 206*c* is resized and moved on the display device 104. For instance, in the orientation 404, the visual object 206*c* is displayed at an edge 602 of the display device 104. In the orientation 406, for example, the edge 602 is a bottom edge of the display device 104.

As the display device 104 rotates from the orientation 404 to the orientation 406, the visual object 206*c* is repositioned away from the edge 602 and begins to resize, e.g., to a smaller size. Further, the visual orientation of the visual object 206*c* remains static to an external viewer's perspective, e.g., to the user 502 observing the display device 104. For example, the user 502 observes that as the display device 104 rotates, the visual object 206*c* does not rotate in a corresponding manner with the display device 104. That is, as the display device 104 rotates, the visual object 206*c* rotates relative to the display device 104 such that the visual object 206*c* retains a same visual perspective to the user 502.

Proceeding with the scenario 600, when the display device 104 rotates to the orientation 408, the visual object 206*c* is resized smaller and positioned along an edge 604 of the display device 104. Further, the visual orientation of the visual object 206*c* remains static to an external viewer's perspective, such as described above. In the orientation 408, the edge 604 is a bottom edge of the display device 104. The scenario 600 is also reversible such that if the display device 104 is rotated from the orientation 408 to the orientation 404, the visual object 206*c* is resized and repositioned as reflected in the upper portion of the scenario 600.

Generally, visual manipulation of the visual object 206*c* that enables the visual object 206*c* to maintain its visual orientation to an external viewer while the display device 104 rotates represents a visual transformation, such as generated and described with reference to the scenarios above.

Among other improvements obtained using the implementations discussed in the scenarios 400-600 is the ability to provide a stable visual environment when a large form factor device is moved between different positions. For instance, consider that in the scenarios 500, 600, the display device 104 is a large device such as a large screen monitor and/or a meeting room device. By utilizing a motion profile 130 for the display device 104 to control and/or stabilize motion of the visual objects 206*b*, 206*c* when the display device 104 is moved (e.g., rotated) between different positions, a user is presented with a stabile visual experience that avoids potentially disorienting the user with sudden large movements of visual objects display on the display device 104.

Figure 7:
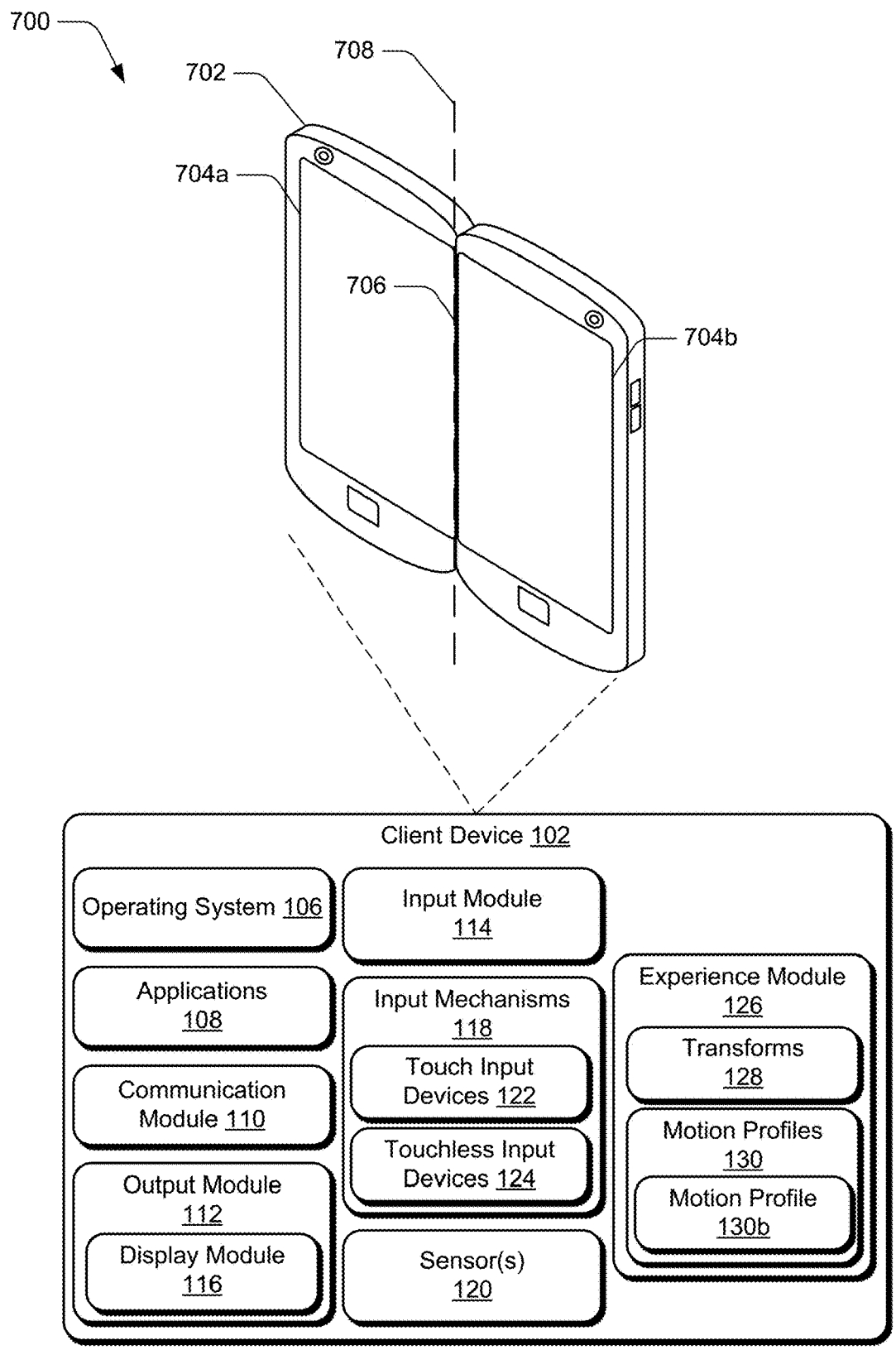
FIG. 7 depicts an example implementation of a client device as a multi-display device in accordance with one or more implementations.

FIG. 7 depicts an example implementation of the client device 102 as a multi-display device 702. The multi-display device 702, for instance, represents a portable device, such as a handheld computing device. In this implementation, the multi-display device 702 includes a display surface 704*a* and a display surface 704*b* that are connected to one another via a hinge 706. In at least one implementation, the display surfaces 704*a*, 704*b* represent different instances of the display device 104. Further, the functionality of the client device 102 is maintained within one or both of the display surfaces 704*a*, 704*b* of the multi-display device 702. The display surfaces 704*a*, 704*b*, for instance, combine to form an integrated instance of the client device 102. Alternatively or additionally, the display surfaces 704*a*, 704*b* are disconnectable about the hinge 706 such that the display surface 704*a* and the display surface 704*b* each represent a separately functional instance of the client device 102.

Generally, the hinge 706 is configured to rotationally move about an axis 708 of the hinge 706 to allow an angle between the display surfaces 704*a*, 704*b* to change. In this way, the hinge 706 allows the display surfaces 704*a*, 704*b* to be connected to one another yet be oriented at different angles and/or planar orientations relative to each other. In at least some implementations, the display surfaces 704*a*, 704*b* may represent different portions of a single integrated and continuous display surface that can be bent along the hinge 706. Thus, the hinge 706 may represent a separate component that hingeably attaches the two separate display surfaces 704*a*, 704*b*, or the hinge 706 may represent a portion of a single integrated display surface that includes the display surfaces 704a, 704b and about which the display surfaces 704a, 704b can bend.

According to implementations for visual transformation using a motion profile described herein, the multi-display device 702 has a motion profile 130b that describes a movement pattern for the multi-display device 702. The motion profile 130b, for instance, indicates that movement of the multi-display device 702 involves rotation (e.g., pivoting) of the display surfaces 704a, 704b relative to one another. Thus, the motion profile 130b can be utilized to evaluate a transform 128 for visually transforming a visual object displayed via the multi-display device 702.

Figure 8:
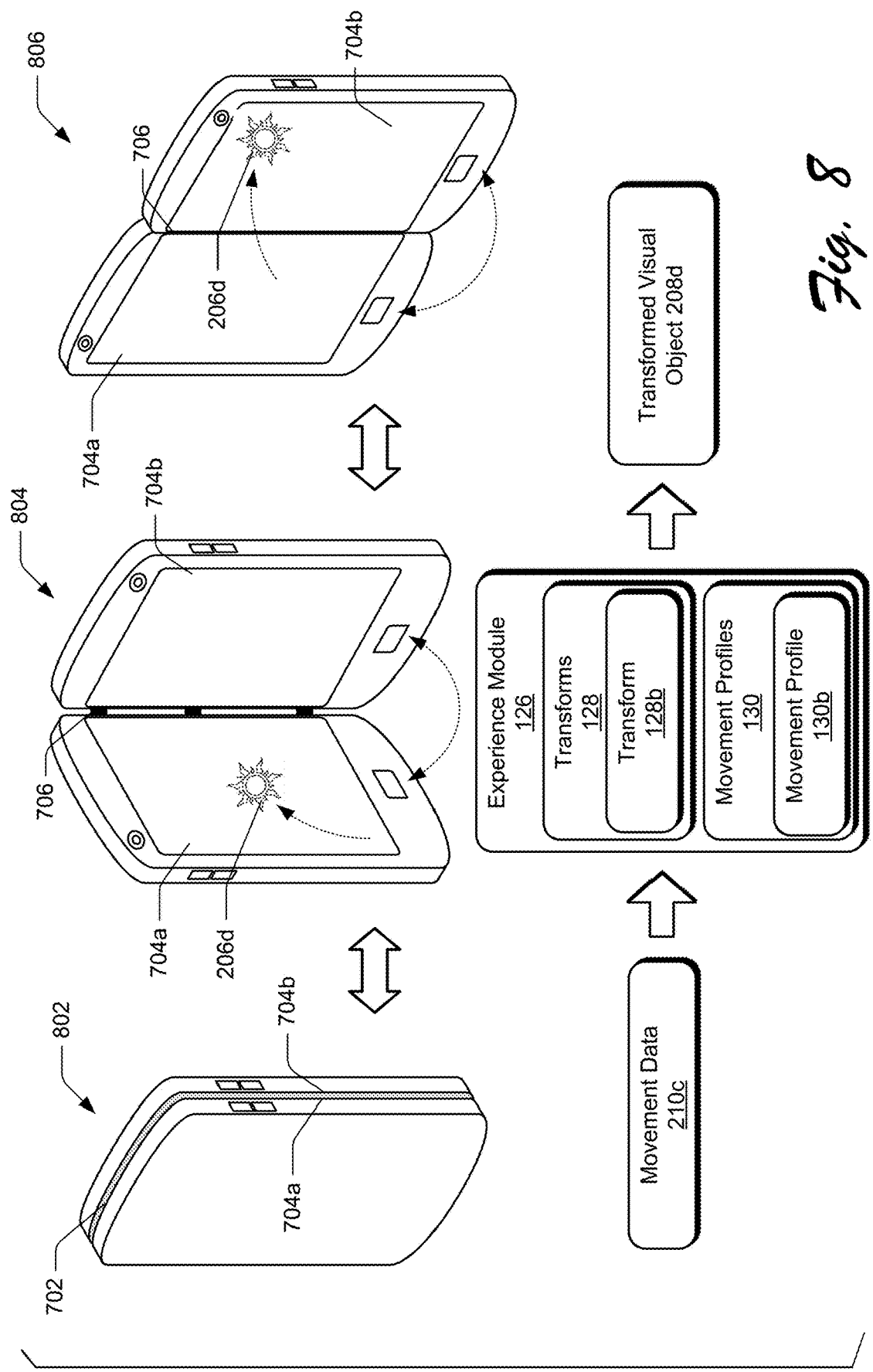
FIG. 8 depicts an example implementation scenario for visual object transformation in a multi-screen device in accordance with one or more implementations.

FIG. 8 depicts an example implementation scenario 800 for visual object transformation in a multi-screen device. The left portion of the scenario 800 shows the multi-display device 702 in an orientation 802. The orientation 802, for instance, represents a closed position for the multi-display device 702 where the display surfaces 704a, 704b are facing one another. In at least one implementation, the orientation 802 represents a low power mode for the multi-display device 702, such a sleep or power-off mode.

Proceeding to the center and right portions of the scenario 800, the display surfaces 704a, 704b are repositioned to an orientation 804 and then to an orientation 806 for the multi-display device 702. For instance, one or both of the display surfaces 704a, 704b are rotated about the hinge 706 to the orientations 804, 806. A user, for example, grasps one or both of the display surfaces 704a, 704b and opens the multi-display device 702 from the orientation 802 to the orientation 804 and on to the orientation 806.

Notice that as the multi-display device 702 opens from the orientation 802 to the orientation 804, a visual object 206d begins moving across the display surface 704a. For instance, as the multi-display device 702 opens from the orientation 802 to the orientation 804, the visual object 206d moves upward and to the right from a position in the lower left corner of the display surface 704a to a position near the center of the display surface 704a. As the multi-display device 702 opens further from the orientation 804 to the orientation 806, the visual object moves from the position near the center of the display surface 704a to a position in the upper right of the display surface 704b.

Generally, this movement of the visual object 206d represents a visual transformation of the visual object 206d. For instance, pivoting of the display surfaces 704a, 704b relative to one another is captured as movement data 210c. The movement data 210c is used to evaluate a transform 128b according to the motion profile 130b to generate a transformed visual object 208d, e.g., a visually reconfigured visual object 206d. The transform 128b, for instance, indicates a translational movement of the visual object 206d across the display surfaces 704a, 704b. The transform 128b may also include a different type of visual transformation of the visual object 206d, such as a rotation, a change in brightness, a resizing, and so forth. For instance, in addition to moving from the position 808 to the positions 810, 812, the visual object 206d can also increase in visual brightness and/or contrast as it travels across the display surfaces 704a, 704b.

The movement data 210c can be captured in various ways, such as via one or more sensors 120 that detect pivoting of the display surfaces 704a, 704b relative to one another, and/or rotation of the hinge 706. For instance, the movement data 210c can be used to quantify a relative position of the display surfaces 704a, 704b, such as based on an angle between the display surfaces 704a, 704b and/or an amount of rotation of the hinge 706 from the orientation 802. Thus, a position and/or visual appearance of the visual object 206d can be functionally tied to a relative position of the display surfaces 704a, 704b such that as the multi-display device 702 opens and closes, the visual object 206d can be visually transform in different ways, such as discussed above.

Figure 9:
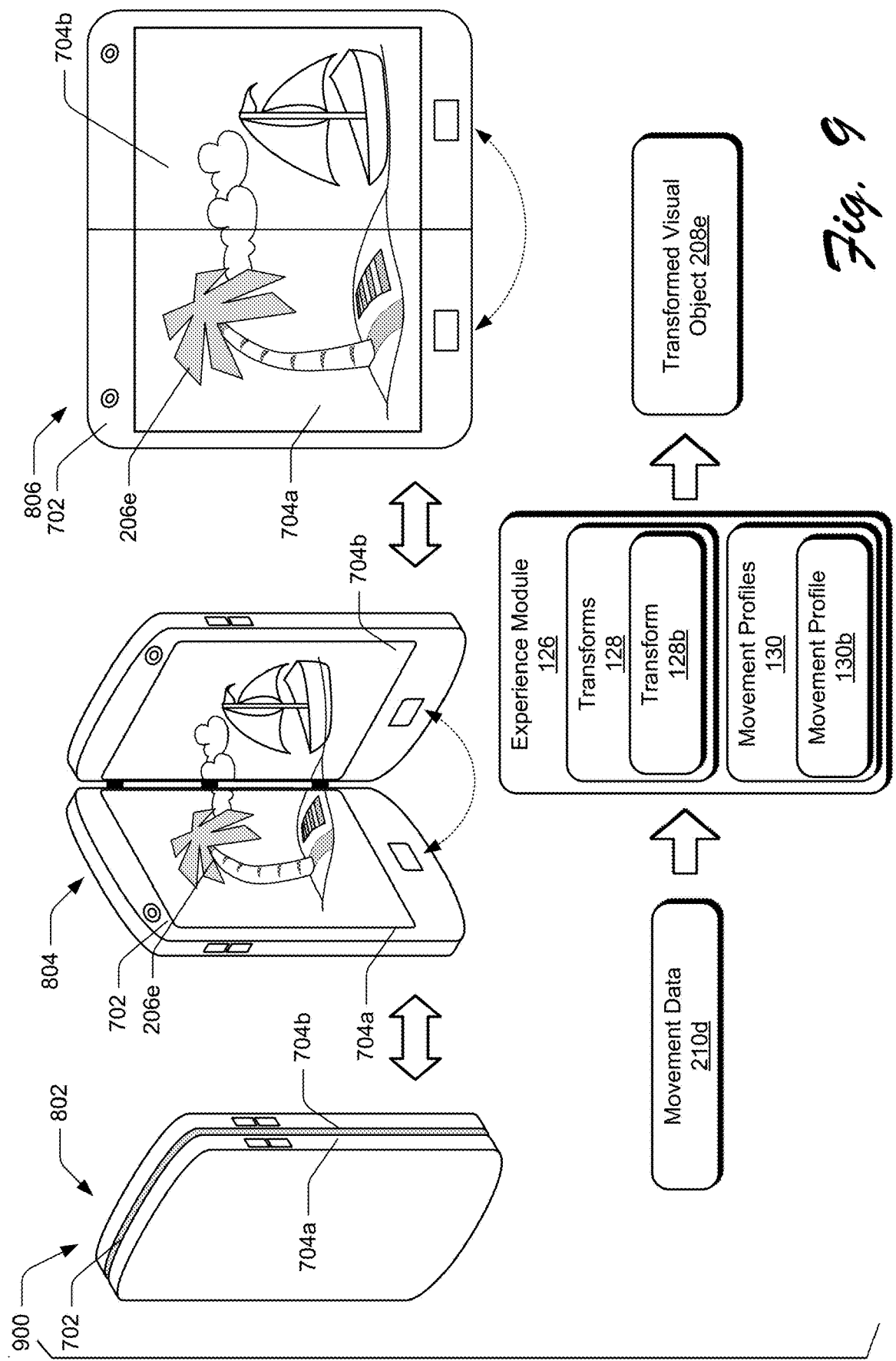
FIG. 9 depicts an example implementation scenario for visual object transformation in a multi-screen device in accordance with one or more implementations.

FIG. 9 depicts an example implementation scenario 900 for visual object transformation in a multi-display device. The scenario 900 illustrates the multi-display device 702 transitioning from the orientation 802 to the orientations 804, 806 such as described above. Further, a visual object 206e is displayed on the display surfaces 704a, 704b.

Notice that when the multi-display device 702 is opened from the orientation 802 to the orientation 804, the visual object 206e is displayed across the display surfaces 704a, 704b. Further, the visual object 206e is displayed on the display surfaces 704a, 704b to provide the user 502 viewing the display surfaces 704a, 704b with a "flat" perspective of the visual object 206e. For instance, the respective portions of the visual object 206e on the display surfaces 704a, 704b are not bent about the hinge 706, but are displayed as if they are presented on a flat display surface.

Further, notice that as the multi-display device 702 is opened from the orientation 804 to the orientation 806, the visual object 206e is resized larger and the external visual perspective of the visual object 206e remains consistent from the orientation 804 to the orientation 806. The visual object 206e, for instance, is displayed such that the visual object 206e does not visually bend as the display surfaces 704a, 704b pivot relative to one another, but maintains a consistent visual perspective to an external viewer (e.g., the user 502) as the display surfaces 704a, 704b pivot.

Generally, this resizing and consistent visual perspective for the visual object 206e is achieved via application of a transform 128c and utilizing the motion profile 130b for the multi-display device 702. For instance, the experience module 126 receives movement data 210d that describes relative movement of the display surfaces 704a, 704b. The experience module 126 then uses the movement data 210d along with the motion profile 130b to evaluate the transform 128c and generate a transformed visual object 208e that is used to display the visual object 206e across movement of the multi-display device 702 between the orientations 802, 804, 806. For instance, enabling the visual object 206d to maintain a consistent external visual perspective while the multi-display device 702 transitions from the orientation 804 to the orientation 806 (and vice-versa) involves transforming a visual angle of the visual object 206d relative to display surfaces 704a, 704b as the display surfaces 704a, 704b pivot relative to each other. In at least one implementation, user presence data can be used to evaluate the transform 128b based on user location data captured via the sensors 120, e.g., a camera and/or other user presence detection method. A size and/or display angle of the visual object 206d, for instance, can be configured based on a user's viewing angle and/or viewing distance relative to the display surfaces 704a, 704b.

The scenario 900 also functions in reverse such that when the multi-display device 702 closes from the orientation 806 to the orientation 804, the visual object 206d maintains the same, consistent visual perspective as the display surfaces 704a, 704b pivot between the different orientations. Further, the visual object 206d may resize smaller as the multi-display device 702 closes from the orientation 806 to the orientation 804.

Accordingly, the scenarios described above and depicted in the corresponding figures illustrate that known movement patterns for devices can be leveraged to determine how to visually transform visual objects displayed on the devices. The devices, movement patterns, and visual transformations described in the example scenarios are representative of just a few examples, and it is to be appreciated that techniques for visual transformation using a motion profile described herein can be employed in a wide variety of device form factors with different movement patterns and to generate a variety of different visual transformations not explicitly discussed herein.

Having described some example implementation scenarios, consider now some example procedures for visual transformation using a motion profile in accordance with one or more implementations.

Example Procedures

The following discussion describes example procedures for visual transformation using a motion profile in accordance with one or more implementations. The example procedures may be employed in the environment 100 of FIG. 1, the system 1200 of FIG. 12, and/or any other suitable environment. The procedures, for instance, represent procedures for implementing the example implementation scenarios discussed above. In at least some implementations, the steps described for the various procedures can be implemented automatically and independent of user interaction, such as by the experience module 126. Further, the steps described in the procedures below can be performed in any suitable combination and/or order, and are not intended to be construed as limited to the orders described.

Figure 10:
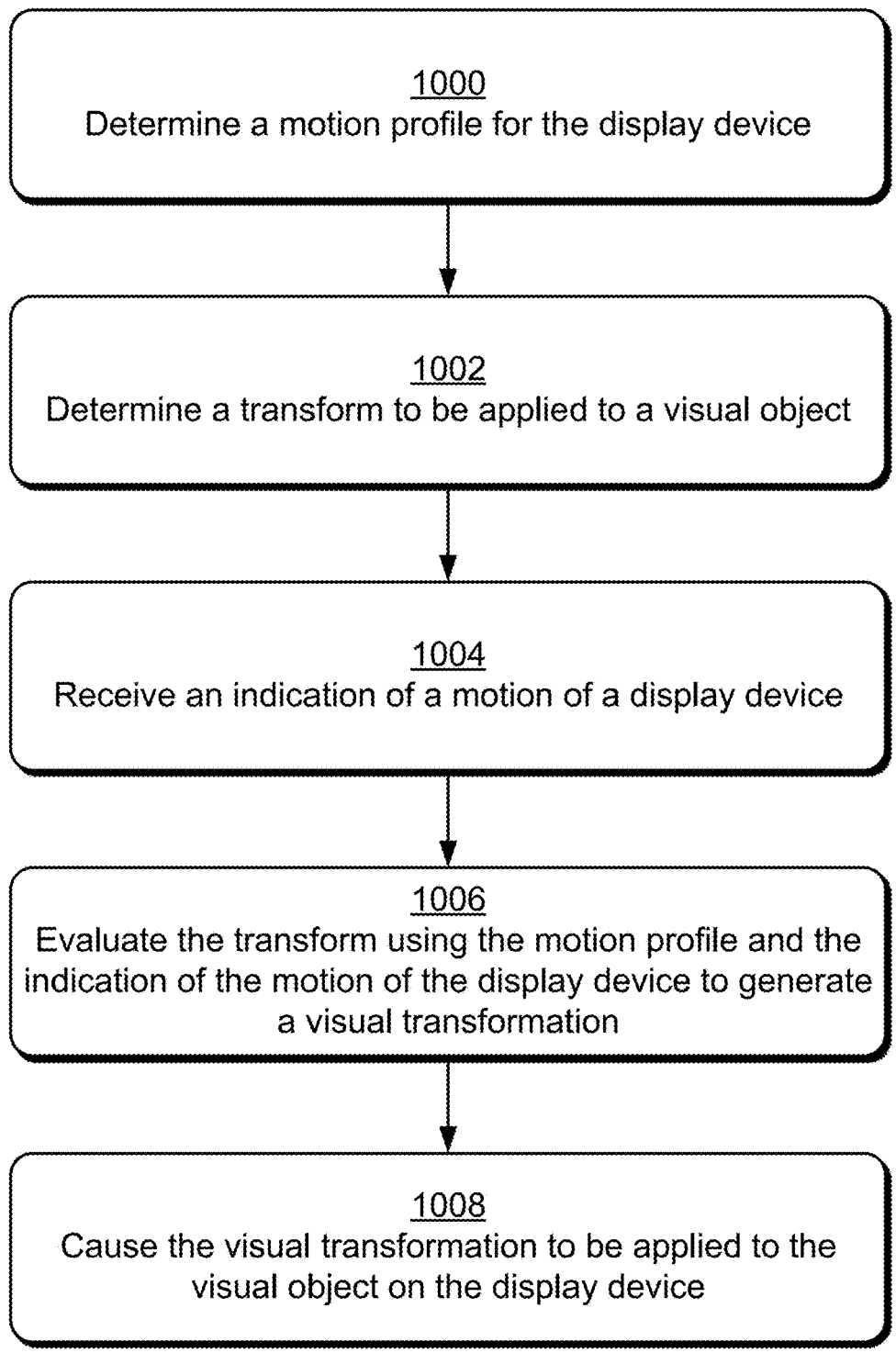
FIG. 10 is a flow diagram that describes steps in a method for visually transforming a visual object in accordance with one or more implementations.

FIG. 10 is a flow diagram that describes steps in a method in accordance with one or more implementations. The method, for instance, describes an example procedure for visually transforming a visual object.

Step 1000 determines a motion profile for a display device. The motion profile, for instance, is selected from the motion profiles 130 which are maintained for multiple different devices. In at least one implementation, the motion profile is determined by matching the display device to a corresponding motion profile, such as based on a device type and/or device identifier for the display device and/or an associated apparatus. The motion profiles 130, for example, are indexed and/or tagged based on respective device types and/or device identifiers.

Step 1002 determines a transform to be applied to a visual object. For instance, the experience module 126 selects a transform 128 to be used to visually transform the visual object. The transform can be selected in various ways. The visual object, for example, can be associated with a particular transform 128, such as via metadata of the visual object that identifies an instance of the transforms 128 that is to be used for visually transforming the visual object. Alternatively or additionally, an instruction is received that identifies the transform to be used, such as from the operating system 106 or an application 108. In at least one implementation, different transforms 128 can be applied to different visual objects, such as based on identifiers and/or visual types for the visual objects.

Step 1004 receives an indication of a motion of the display device. The experience module 126, for instance, receives an indication of movement for the display device 104, such as rotation of the display device 104 or pivoting of one or more the display surfaces 704a, 704b. The indication of motion may be received in various ways, such as from a sensor 120, the input module 114, and/or the input mechanisms 118.

In at least one implementation, the indication of motion includes an amount of motion, such as a quantity term that can be used to quantify the motion. For instance, motion can be quantified in different ways, such as a number of degrees that the display device 104 is rotated from a particular orientation (e.g., between 0-180 degrees), a number of degrees that the display surface 704a is pivoted relative to the display surface 704b (and/or vice versa, e.g., between 0-180 degrees), and so forth.

The indication of motion may additionally or alternatively include an indication of a direction of the motion. For instance, motion of the display device 104 can be described as clockwise rotation (between 0 to +180 degrees) or counterclockwise, e.g., between 0 to −180 degrees. As another example, pivoting of the multi-display device 104 can be described as opening a certain number of degrees from the orientation 802 (e.g., between 0 to +180 degrees) or closing from the orientation 806, e.g., between 0 to −180 degrees.

In some implementations, however, the indication of motion may not indicate a particular type of movement, e.g., rotation, pivoting, and so forth. For instance, a motion profile 130 for a display device can identify a type of movement for the display device (e.g., rotation, pivoting, translation, and so forth), and thus the type of movement may not be identified by the indication of motion but inferred from the motion profile 130 for the device.

Step 1006 evaluates the transform using the motion profile and the indication of the motion of the display device to generate a visual transformation. For instance, a type and/or direction of device motion indicated by the motion profile can be used to evaluate the transform, e.g., to determine a visual direction in which the transform is to be applied. For instance, if the motion profile indicates that the display device is associated with rotational movement, "rotation" and/or a direction of the rotation can be used as an input for evaluating the transform. As another example, if the motion profile indicates that the display device is associated with pivoting movement, "pivoting" and/or a direction of the pivoting can be used as input for evaluating the transform.

As referenced above, the indication of device motion can include a quantity term that indicates a relative amount of device movement. Thus, in at least one implementation, a type of device movement, a direction of device movement, and an amount of device movement can be used as inputs for evaluating the transform.

Consider, for example, that the transform specifies a visual rotation to maintain a consistent external visual perspective for the visual object, such as described with reference to the scenario 500. Further, the movement profile indicates rotational movement for the display device and the indication of device motion indicates counterclockwise rotation by n degrees. In this example, the transform is evaluated using these inputs to specify a visual transformation of a clockwise rotation of the visual object of n degrees to cause the visual object to maintain a consistent external visual perspective for the visual object as the display device rotates.

This example evaluation is presented for purpose of example only, and it is to be appreciated that a wide variety of different transforms, motion profiles, and indications of movements are considered to be within the scope of the implementations described in this disclosure.

Step 1008 causes the visual transformation to be applied to the visual object on the display device. The experience module 126, for example, causes the visual transformation to be applied to the visual object such that the visual object is visually reconfigured on the display device, such as via motion and/or change in visual appearance of the visual object. In at least one implementation, the experience module 126 communicates the visual transformation to the display module 116, and the display module 116 applies the visual transformation to the visual object. The display module 116, for example, renders the visual object according to the visual transformation.

Figure 11:
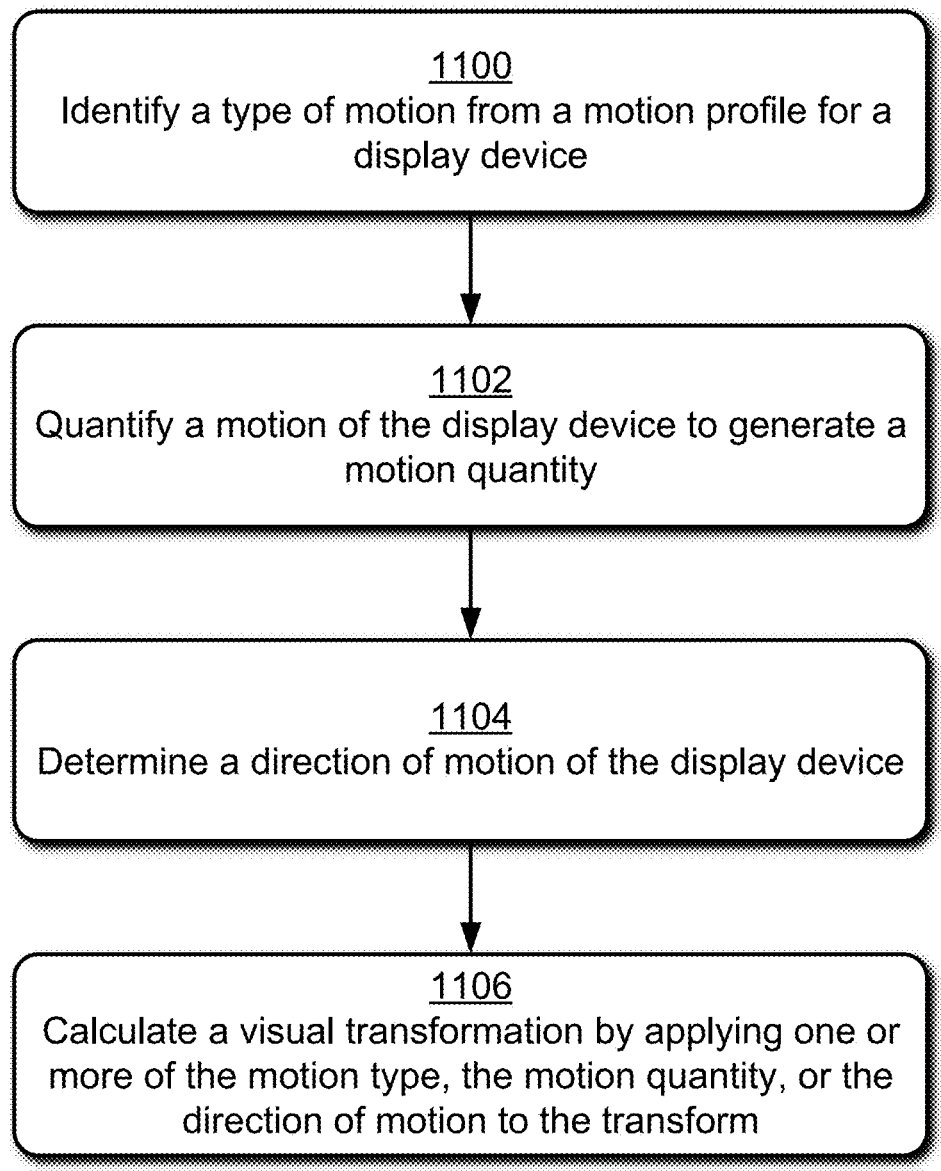
FIG. 11 is a flow diagram that describes steps in a method for evaluating a transform for visually transforming a visual object in accordance with one or more implementations.

FIG. 11 is a flow diagram that describes steps in a method in accordance with one or more implementations. The method, for instance, describes an example procedure for evaluating a transform for visually transforming a visual object. In at least one implementation, the method describes an example way of performing step 1006 of the procedure discussed above.

Step 1100 identifies a type of motion from a motion profile for a display device. As discussed above, a motion profile specifies a type of motion associated with a device, such as rotation, translation, pivoting, and/or combinations thereof. Generally, data from a motion profile 130 for a device is independent of real-time motion data generated from actual motion of the device. A motion profile 130, for instance, represents persistent data that is stored in memory and can be retrieved and used multiple times to generate visual transformations of different visual objects. In at least one implementation, a motion profile 130 for a display device is generated by a device manufacturer and/or a software developer and independent of an actual usage of the display device.

Step 1102 quantifies a motion of the display device to generate a motion quantity. For instance, sensor data from a sensor 120 is used to determine how far the display device moves, such as how far the display device rotates, pivots, and/or moves translationally. Examples of different ways for quantifying device motion are discussed above.

Step 1104 determines a direction of motion of the display device. Sensor data from a sensor 120, for example, can be used to determine a direction that the display device moves, such as a direction of rotation, pivoting, translation, and so forth. In at least one implementation, step 1104 is optional. For instance, a type of motion specified by the motion profile 130 for the display device can be used to characterize the direction of device motion and regardless of determining an actual direction of device motion in real-time.

Step 1106 calculates a visual transformation by applying one or more of the motion type, the motion quantity, or the direction of motion to the transform. The transform, for instance, can indicate a particular visual transformation that is to be applied based on the motion type. Further, the motion quantity can be used to determine "how much" of the transform to apply to generate the visual transformation. For example, the transform can specify how much visual transformation is to be applied for a corresponding amount of device motion. As one example, a rotation transform can specify that for every n degrees of device rotation, n' units of visual object rotation is to be generated. As another example, a translational transform can specify that for every n degrees of device pivoting, n' units of visual object translation is to be generated. These implementations are presented for purpose of example only, and are intended to illustrate that a way in which a transform is applied can be driven by an amount of device motion.

In at least one implementation, a direction of device motion can be used in evaluating the transform. For instance, the direction of device motion can be used to determine various aspects of a visual transformation generated from a transform, such as a type of visual transformation and/or a direction of visual transformation. As one example, when a device motion is in a particular direction relative to the device, a transform can be evaluated to generated a visual transformation in the same or opposite direction.

Accordingly, techniques described herein provide ways of utilizing known device movement patterns to generate transformations of visual objects. This reduces reliance on sensor data to provide motion-related information, thus conserving power and battery life of a device on which a visual transformation is generated.

Example System and Device

Figure 12:
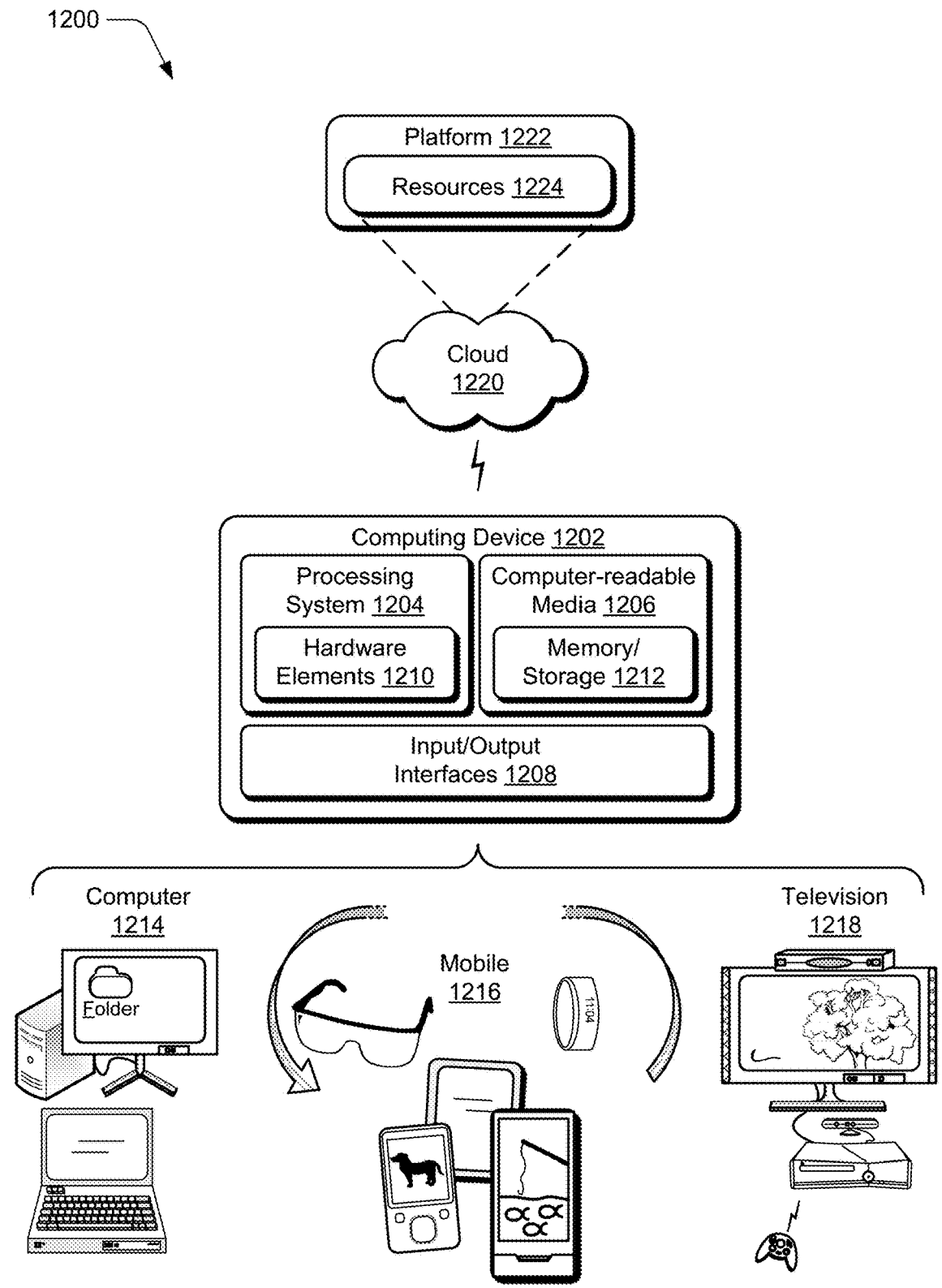
FIG. 12 illustrates an example system including various components of an example device that can be implemented as any type of device as described with reference to FIGS. 1-11 to implement techniques described herein.

FIG. 12 illustrates an example system generally at 1200 that includes an example computing device 1202 that is representative of one or more computing systems and/or devices that may implement various techniques described herein. For example, the client device 102 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), motion functionality (e.g., accelerometers or other sensors that are configured to detect physical motion), a camera (e.g., which may employ visible or non-visible wavelengths such as infrared frequencies to detect movement that does not involve touch as gestures), six degrees of freedom controllers such as used in virtual reality and augmented reality technologies, and so forth. Examples of output devices include a display device (e.g., a monitor or projector), speakers, a printer, a network card, tactile-response device, head mounted displays (e.g., for virtual reality and augmented reality applications), and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a wearable device (e.g., a watch, glasses, an article of clothing, etc.), a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the client device 102 and/or the experience module 126 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device implementation, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for causing a visual transformation of a visual object, the system including: at least one processor; and at least one computer-readable storage media storing instructions that are executable by the at least one processor to perform operations including: determining a motion profile for a display device and a transform to be applied to a visual object; receiving an indication of a motion of the display device; evaluating the transform using the motion profile and the indication of the motion of the display device to generate a visual transformation; and causing the visual transformation to be applied to the visual object on the display device.

In addition to any of the above described systems, any one or combination of: wherein the motion profile includes a known motion pattern for the display device; wherein said determining the motion profile is based on one or more of a device type for the display device, or a device identifier for the display device; wherein the motion profile is independent of the indication of the motion of the display device; wherein said determining the transform includes determining the transform based on one or more of a visual type for the visual object, or an identifier for the visual object; wherein the motion profile indicates that the display device is associated with a rotational motion pattern, and wherein the visual transformation is generated based on a rotational movement of the display device inferred from the motion profile; wherein the motion profile indicates that the display device is associated with a pivoting motion pattern, and wherein the visual transformation is generated based on a pivoting movement of the display device inferred from the motion profile; wherein the visual transformation includes one or more of a translational movement of the visual object or a rotational movement of the visual object, and wherein said causing the visual transformation to be applied includes causing one or more of translational movement of the visual object relative to the display device, or rotational movement of the visual object relative to the display device.

A computer-implemented method for causing a visual transformation of a visual object, the method including: determining a motion profile for a display device and a transform to be applied to a visual object on the display device; receiving an indication of a motion of a display device; evaluating the transform using the motion profile and the indication of the motion of the display device to generate a visual transformation; and causing the visual transformation to be applied to the visual object on the display device to correspond to the motion of the display device.

In addition to any of the above described methods, any one or combination of: wherein said receiving the indication of the motion includes receiving an indication of an amount of movement of the display device without an indication of a type of movement; wherein said determining the motion profile includes selecting the motion profile from multiple different motion profiles, and wherein the motion profile is selected based on one or more of a device type associated with the display device or a device identifier associated with the display device; wherein said determining the transform includes selecting the transform from multiple different transforms and based on one or more of a visual type for the visual object or an identifier for the visual object; wherein said receiving the indication of the motion includes receiving an indication of an amount of movement of the display device, and wherein said evaluating the transform includes generating the visual transformation based on the amount of movement; wherein the indication of the motion of the display device includes an indication that the display device moves from a first orientation to a second orientation, and wherein said causing the visual transformation to be applied includes causing multiple instances of the visual transformation to be applied to the visual object as the display device moves from the first orientation to the second orientation.

A system for causing a visual transformation of a visual object, the system including: one or more processors; and one or more computer-readable storage media storing computer-executable code that is executable by the one or more processors to implement functionality including: a transform including data that specifies a visual transformation; a motion profile that indicates a known motion pattern for a display device; and an experience module configured to receive motion data describing a motion of the display device, evaluate the transform using the motion profile and the motion data to generate a visual transformation, and causing the visual transformation to be applied to a visual object on the display device.

In addition to any of the above described systems, any one or combination of: wherein the motion profile is selected from a set of motion profiles that each include different known motion patterns for different respective display devices; wherein the known motion pattern includes a type of motion associated with the display device; wherein the known motion pattern includes a rotation of the display device relative to a center of rotation of the display device; wherein the known motion pattern includes a pivoting of the display device relative to an apparatus that is attached to the display device; wherein the motion data includes an amount of motion for the display device, the known motion pattern includes a type of motion associated with the display device, and wherein the experience module is configured to evaluate the transform by applying the amount of motion to the type of motion to generate the visual transformation.

Conclusion

Techniques for visual transformation using a motion profile are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A system comprising:
    at least one processor; and
    at least one computer-readable storage media storing instructions that are executable by the at least one processor to perform operations including:
        detecting a motion associated with a display device;
        in response to detecting the motion, identifying first device identifier data for the display device and second device identifier data for one or more apparatuses having a physical connection with the display device and providing constraints on movement of the display device;
        selecting, from a plurality of motion profiles, a motion profile for the display device based the first device identifier data for the display device and the second device identifier data for the one or more apparatuses having the physical connection to the display device, wherein the motion profile comprises stored data indicating one or more known motion patterns for motion of the display device based on constraint to the display device caused by the physical connection with the one or more apparatuses;
        determining a transform to be applied to a visual object by comparing motion data associated with the motion with the one or more known motion patterns from only the motion profile selected in the selecting; and
        causing a visual transformation to be applied to the visual object on the display device based on a result of the determining of the transform.

2. The system as described in claim 1, wherein said determining the transform comprises determining the transform based on one or more of: a visual type for the visual object and an identifier for the visual object.

3. The system as described in claim 1, wherein the motion profile indicates that the display device is associated with a rotational motion pattern, and wherein the visual transformation is generated based on a rotational movement of the display device inferred from the motion profile.

4. The system as described in claim 1, wherein the motion profile indicates that the display device is associated with a pivoting motion pattern, and wherein the visual transformation is generated based on a pivoting movement of the display device inferred from the motion profile.

5. The system as described in claim 1, wherein the visual transformation comprises one or more of a translational movement of the visual object or a rotational movement of the visual object, and wherein said causing the visual transformation to be applied comprises causing one or more of translational movement of the visual object relative to the display device, or rotational movement of the visual object relative to the display device.

6. The system as described in claim 1, wherein the one or more known motion patterns comprises data indicating motion of the display device based on the display device being fastened to a physical structure via the one or more apparatuses.

7. The system as described in claim 6, wherein the one or more known motion patterns comprises a motion pattern for the display device rotating via the one or more apparatuses relative to the physical structure.

8. The system as described in claim 1, wherein the determining of the transform comprises creating a motion transform for visual object using the one or more known motion patterns of the motion profile, and modifying a motion path identified by the one or more known motion patterns of the motion profile based on the motion data associated with the motion.

9. A computer-implemented method, comprising:
    detecting a motion associated with a display device;
    in response to detecting the motion, identifying first device identifier data for the display device and second device identifier data for one or more apparatuses having a physical connection with the display device and providing constraints on movement of the display device;
    selecting, from a plurality of motion profiles, a motion profile for the display device based the first device identifier data for the display device and the second device identifier data for the one or more apparatuses having the physical connection to the display device, wherein the motion profile comprises stored data indicating one or more known motion patterns for motion of the display device based on constraint to the display device caused by the physical connection with the one or more apparatuses;

determining a transform to be applied to a visual object by comparing motion data associated with the motion with the one or more known motion patterns from only the motion profile selected in the selecting; and causing a visual transformation to be applied to the visual object based on a result of the determining of the transform.

10. The computer-implemented method as described in claim 9, wherein said determining the transform comprises selecting the transform from multiple different transforms and based on one or more of: a visual type for the visual object and an identifier for the visual object.

11. The computer-implemented method as described in claim 9, wherein said receiving the indication of the motion comprises receiving an indication of an amount of movement of the display device, and wherein said evaluating the transform comprises generating the visual transformation based on the amount of movement.

12. The computer-implemented method as described in claim 9, wherein the indication of the motion of the display device comprises an indication that the display device moves from a first orientation to a second orientation, and wherein said causing the visual transformation to be applied comprises causing multiple instances of the visual transformation to be applied to the visual object as the display device moves from the first orientation to the second orientation.

13. The computer-implemented method as described in claim 9, wherein the one or more known motion patterns, comprises data indicating motion of the display device based on the display device being fastened to a physical structure via the one or more apparatuses.

14. The computer-implemented method as described in claim 13, wherein the one or more known motion patterns for the display device comprises a motion pattern for the display device rotating via the one or more other apparatuses relative to the physical structure.

15. The computer-implemented method as described in claim 9, wherein the determining of the transform comprises creating a motion transform for visual object using the one or more known motion patterns of the motion profile, and modifying a motion path identified by the one or more known motion patterns of the motion profile based on the motion data associated with the motion.

16. A system comprising:
a display device;
one or more processors; and
one or more computer-readable storage media storing computer-executable code that is executable by the one or more processors to execute a method that comprises:
detecting a motion associated with the display device;
in response to detecting the motion, identifying first device identifier data for the display device and second device identifier data for one or more apparatuses having a physical connection with the display device and providing constraints on movement of the display device;
selecting, from a plurality of motion profiles, a motion profile for the display device based the first device identifier data for the display device and the second device identifier data for the one or more apparatuses having the physical connection to the display device, wherein the motion profile comprises stored data indicating one or more known motion patterns for motion of the display device based on constraint to the display device caused by the physical connection with the one or more apparatuses;
determining a transform to be applied to a visual object by comparing motion data associated with the motion with the one or more known motion patterns from only the motion profile selected in the selecting; and
causing a visual transformation to be applied to the visual object on the display device based on a result of the determining of the transform.

17. The system as described in claim 16, wherein the one or more known motion patterns comprise one or more of a rotation of the display device and a pivoting of the display device relative to the one or more apparatuses having the physical connection to the display device.

18. The system as described in claim 16, wherein the one or more known motion patterns comprises data indicating motion of the display device based on the display device being fastened to a physical structure via the one or more apparatuses.

19. The system as described in claim 18, wherein the one or more known motion patterns for the display device comprises a motion pattern for the display device rotating via the one or more other apparatuses relative to the physical structure.

20. The system as described in claim 16, wherein the determining of the transform comprises creating a motion transform for visual object using the one or more known motion patterns of the motion profile, and modifying a motion path identified by the one or more known motion patterns of the motion profile based on the motion data associated with the motion.

* * * * *